United States Patent
Christensen

(10) Patent No.: US 10,250,743 B2
(45) Date of Patent: *Apr. 2, 2019

(54) SENDER IDENTIFICATION SYSTEM AND METHOD

(75) Inventor: Gerald Todd Christensen, Louisville, CO (US)

(73) Assignee: MOBILE MESSENGER GLOBAL, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/340,536

(22) Filed: Dec. 29, 2011

(65) Prior Publication Data

US 2012/0100839 A1   Apr. 26, 2012

Related U.S. Application Data

(63) Continuation of application No. 11/109,776, filed on Apr. 20, 2005, now Pat. No. 8,103,868.

(51) Int. Cl.
*H04W 4/16* (2009.01)
*H04M 3/42* (2006.01)
*H04L 12/58* (2006.01)

(52) U.S. Cl.
CPC ........ *H04M 3/42042* (2013.01); *H04L 51/12* (2013.01); *H04L 51/38* (2013.01); *H04M 3/42034* (2013.01); *H04M 3/42382* (2013.01); *H04L 51/28* (2013.01)

(58) Field of Classification Search
CPC .............. H04L 12/585; H04L 12/5855; H04L 12/5895; H04L 51/12
USPC ...... 713/155–156; 726/1; 709/204, 206, 207
See application file for complete search history.

(56) References Cited

U.S. PATENT DOCUMENTS

| | | |
|---|---|---|
| 5,850,435 A | 12/1998 | Devillier |
| 5,904,604 A | 5/1999 | Suzuki et al. |
| 5,907,604 A * | 5/1999 | Hsu ........................ H04M 1/576 348/14.01 |
| 6,052,709 A * | 4/2000 | Paul ..................... G06Q 10/107 709/202 |
| 6,324,271 B1 | 11/2001 | Sawyer et al. |
| 6,721,406 B1 | 4/2004 | Contractor |
| 6,782,086 B2 | 8/2004 | Clapper |
| 6,807,267 B2 | 10/2004 | Moss et al. |
| 6,813,344 B1 | 11/2004 | Lemke |

(Continued)

FOREIGN PATENT DOCUMENTS

| | | |
|---|---|---|
| JP | 2001-517911 A | 10/2001 |
| JP | 2004-56191 A | 2/2004 |

(Continued)

OTHER PUBLICATIONS

Novell Identity Manager—Wikipedia, printed out in year 2012.*

(Continued)

*Primary Examiner* — Linglan E Edwards
(74) *Attorney, Agent, or Firm* — Arent Fox LLP

(57) ABSTRACT

A database is queried based upon data contained in a message to obtain sender identification information, at least part of which is not contained in the message as it was sent. The sender identification information is presented to a recipient, which can send a signal accepting or rejecting the message based upon the sender identification information. If an accept signal is entered, the message can be forwarded to the recipient and/or rendered to the recipient.

13 Claims, 9 Drawing Sheets

(56) References Cited

U.S. PATENT DOCUMENTS

| | | | |
|---|---|---|---|
| 6,839,414 B1 | 1/2005 | Enzmann et al. | |
| 6,853,717 B1 | 2/2005 | Frentz et al. | |
| 6,862,342 B1 | 3/2005 | Hua et al. | |
| 7,010,572 B1* | 3/2006 | Benjamin et al. | 709/206 |
| 7,428,580 B2* | 9/2008 | Hullfish | H04L 51/04 455/466 |
| 7,623,849 B2* | 11/2009 | Zellner | H04M 3/42042 379/142.01 |
| 7,873,695 B2* | 1/2011 | Clegg | H04L 51/12 709/206 |
| 7,945,253 B2* | 5/2011 | Zellner | H04M 3/42042 379/142.01 |
| 9,070,118 B2* | 6/2015 | Heikes | H04L 51/04 |
| 2001/0003202 A1* | 6/2001 | Mache | H04L 12/581 713/153 |
| 2002/0181683 A1 | 12/2002 | Mani | |
| 2003/0021400 A1* | 1/2003 | Grandgent | G06F 11/2005 379/202.01 |
| 2003/0196098 A1* | 10/2003 | Dickinson, III | H04L 12/585 713/188 |
| 2004/0088362 A1* | 5/2004 | Curbow | G06Q 10/109 709/207 |
| 2004/0156483 A1* | 8/2004 | Theobald | H04L 12/589 379/88.13 |
| 2004/0177110 A1* | 9/2004 | Rounthwaite | G06Q 10/107 709/202 |
| 2005/0080857 A1 | 4/2005 | Kirsch et al. | |
| 2005/0198159 A1* | 9/2005 | Kirsch | H04L 51/12 709/206 |
| 2005/0198356 A1* | 9/2005 | Delaney | H04L 69/08 709/232 |
| 2007/0094330 A1* | 4/2007 | Russell | G06Q 30/0277 709/206 |
| 2007/0275739 A1* | 11/2007 | Blackburn | H04L 51/12 455/466 |

FOREIGN PATENT DOCUMENTS

| | | |
|---|---|---|
| JP | 2004-96311 A | 3/2004 |
| WO | WO 99/16268 A1 | 4/1999 |

OTHER PUBLICATIONS

2007, Sender ID Framework Protecting Brands and Enhancing Detection of Spam, Phishing, and Zero-Day Exploits, year 2007.*

3GPP-ETSI TISPAN Workshop, "IMS over Fixed Access", Mar. 30-31, 2005, Herndon (Virginia USA). "Comparison of the solutions for providing SMS/MMS over IP acess".

Presence Service, Wikipedia, printed out in year 2008.

Presence Information, Wikipedia, printed out in year 2008.

Rfc2778, published in year Feb. 2000.

International Search Report and Written Opinion dated Sep. 21, 2007 issued in related International Patent Application No. PCT/US2006/14727, filed Apr. 19, 2006.

Combining Authentication with Role-Based Access Control Based on IBS, Jin Wang, et al., Computational Intelligence and Security, 2006 International Conference on, vol. 2, published 2006, pp. 1475-1480.

Secure Authentication and Authorization Scheme for Mobile Devices; Jian Wang, et al., Communications Technology and Application, 2009, ICCTA '09. IEEE International Conference on, published 2009, pp. 207-211.

Enhancing User Authentication in Claim-Based Identity Management; Alrodhan, W.A., et al., Collaborative Technologies and Systems (CTS), 2010 International Symposium on, Published 2010, pp. 75-83.

Japanese Office Action dated Mar. 21, 2012 issued in corresponding Japanese Application No. 2008-507836.

First Examination Report dated Feb. 19, 2013, in counterpart Canadian Patent Application No. 2,605,477 (4 pages).

Second Communication dated Mar. 22, 2013, in counterpart European Application No. 06750702.0 (8 pages).

First Examination Report dated Oct. 29, 2013, in counterpart Australia Patent Application No. 2012203330(3 pages).

* cited by examiner

SENDER IDENTIFICATION SYSTEM AND METHOD

CROSS-REFERENCE TO RELATED APPLICATION

This application is a continuation application of U.S. application Ser. No. 11/109,776, filed Apr. 20, 2005. The disclosure of the prior application is hereby incorporated in its entirety by reference.

FIELD OF THE INVENTION

The field of the invention is messaging, and in particular the transmission of ancillary information pertaining to a message.

BACKGROUND OF THE INVENTION

Caller identification ("Caller ID") systems are known in the art wherein a caller's telephone number is sent along with a telephone call to the called party. The calling party's telephone number is presented to the called party, who can then decide whether to take the call. Likewise, caller ID information is stored in answering machine systems and presented to the called party when the messages are received. In this way, a called party can decide whether or not to listen to a message based upon the displayed caller ID information, and can quickly return such a call if desired.

New telecommunications technologies have been developed for platforms that can also support telephony, such as the wireless telephone. For example, Short Message Service ("SMS") permits text messages of up to certain number characters to be sent and received via the network operator's message center to and from any suitable device (e.g., a cell phone, a computer connected to the Internet, etc.) using a SMS Center. An SMS Center is a telecommunications platform that stores and forwards SMS messages. Similarly, Multimedia Message Service ("MMS") permits the delivery of text, audio, graphics, video, audio and executable code to a recipient through a MMS Center. A MMS Center is a telecommunications platform that stores and forwards multimedia messages. Each gateway can serve a subset of entities communicating via MMS.

A known MMS system is shown in FIG. 1. MMS center A 101 is coupled through the Internet 102 to an Inter-Carrier MMS Center 103 and MMS center B 104. When originator 105 and recipient 106 are served by the same MMS center, the MMS message is handled by that MMS center. However, when the originator and recipient are served by different MMS centers, the message is sent from the originating MMS center (e.g., MMS center A 101) to Inter-Carrier MMS center 103, which processes the message and sends it to the MMS center that serves the recipient (a "terminating MMS center,") e.g., MMS center B 104. The originator can be a person or a computer program (e.g., an application.)

Such new telecommunications technologies would benefit from the ability to convey sender identification information along with a message. This could help prescreen unwanted messages from being sent on to a recipient, assist the recipient in deciding whether or not to view a SMS or MMS message, and help the recipient to review, search and find stored SMS and MMS messages based on corresponding stored sender information.

DETAILED DESCRIPTION

In accordance with embodiments of the present invention, sender information is sent to the recipient of a message. As used herein, "message" includes any data transmission, such as a MMS message, a SMS message, a SMTP message (e-mail), etc. "Message" also includes content, where "content" includes ringtones, music, graphics, games, other binary, executable or interpretable code, whether contained in the body of a message or associated with a message as an attachment, etc., that is sent from a person or an application to a recipient. A service in accordance with an embodiment of the present invention correlates the sender information with the message and causes the sender information to be sent to the recipient or an agent of the recipient.

Figure 1:
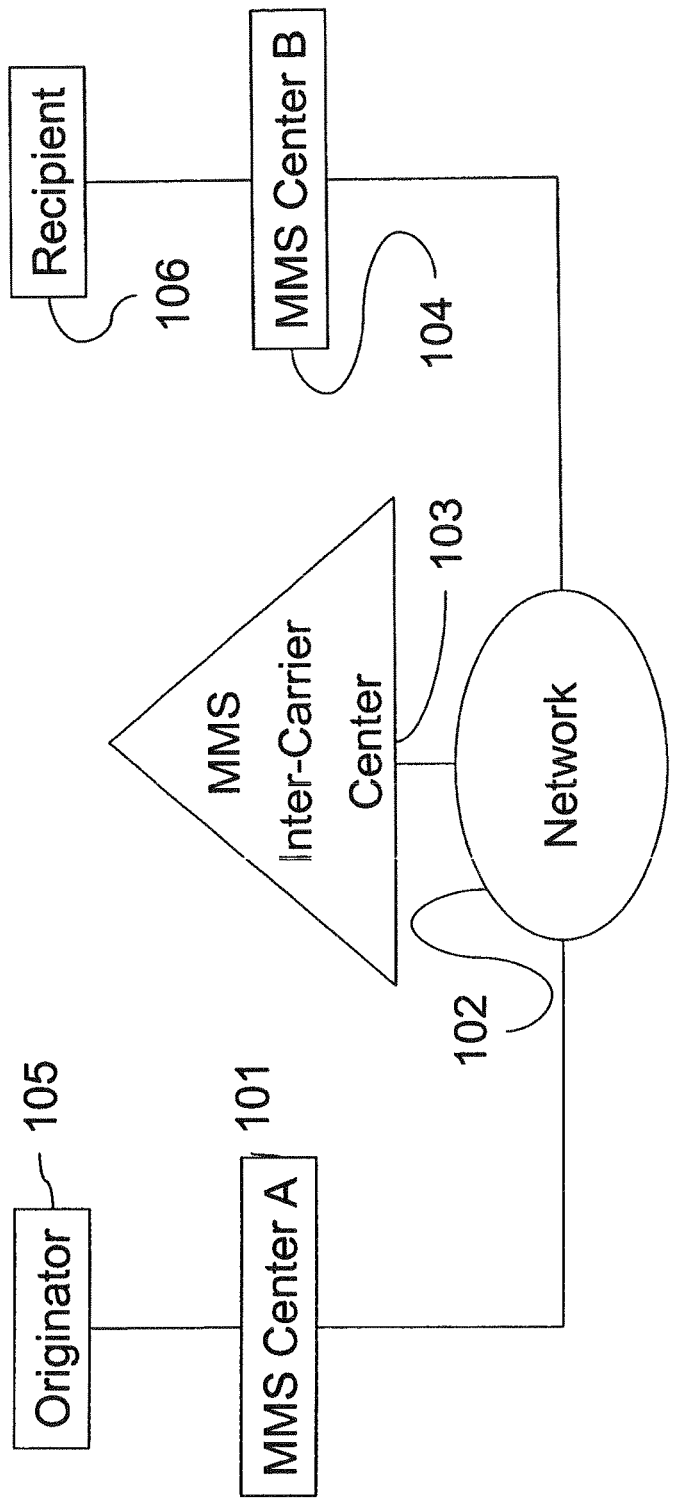
FIG. 1 shows a prior art messaging system.
Figure 2:
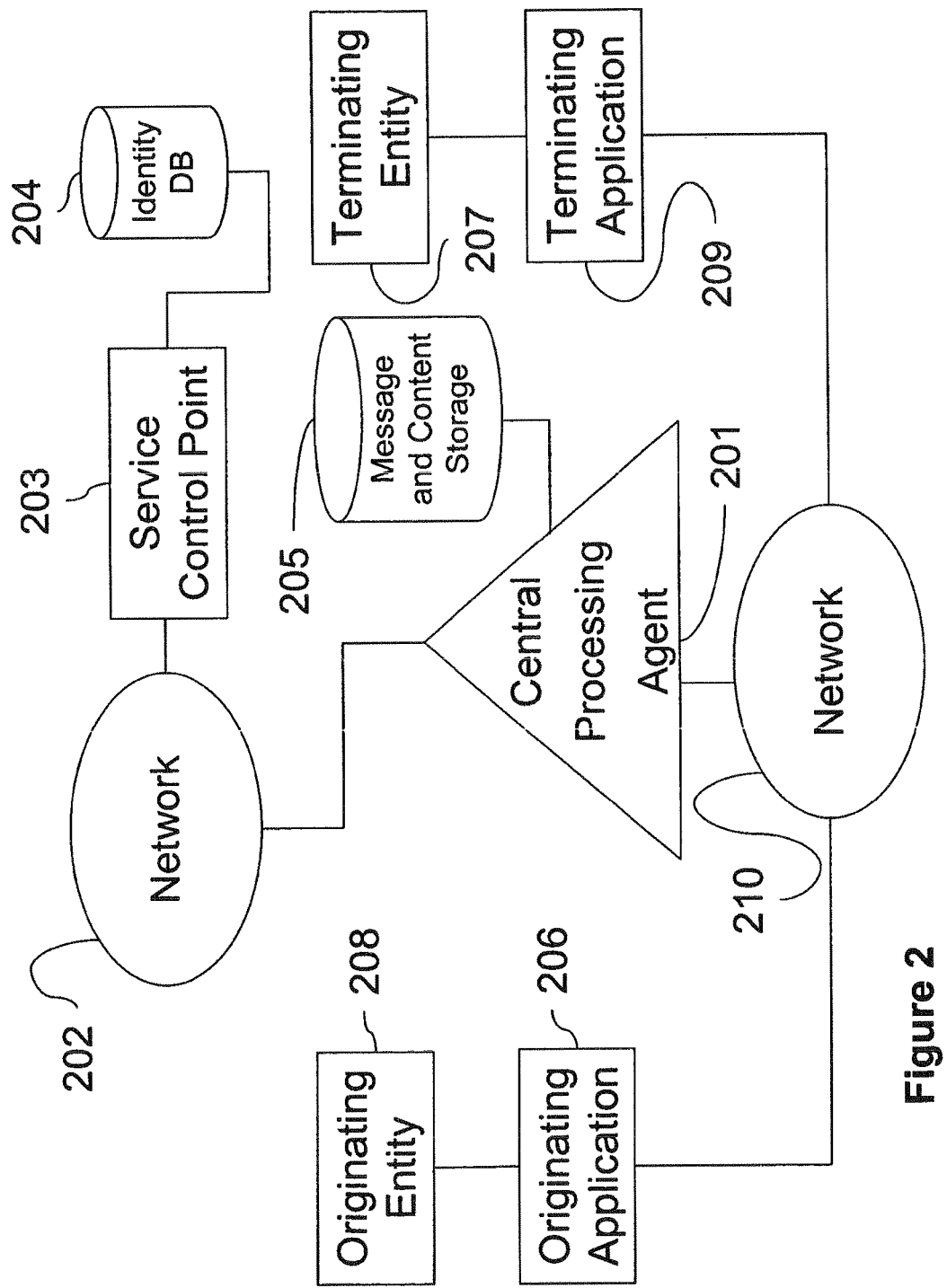
FIG. 2 shows a messaging system where an identity database can be accessed by a Centralized Processing Agent in accordance with an embodiment of the present invention.

A system in accordance with an embodiment of the present invention is shown in FIG. 2. Centralized Processing Agent 201 can be coupled via a network 202 (such as a SS7 switching network, the Internet or another IP network, etc.) directly or through a Service Control Point 203 to an Identity Database 204. Centralized Processing Agent 201 can, for example, function as an Inter-Carrier message center, a SMTP server, etc. Centralized Processing Agent 201 can also be coupled to a Message and Content Storage Database 205, which can store messages and/or sender information associated with messages to be forwarded later to or towards their intended recipients. Centralized Processing Agent 201 can communicate with Originating Application 206 and Terminating Application 207 using any suitable protocol through any suitable network 210, such as the Internet, a wireless network, a LAN, a combination of networks, etc. Originating Application 206 can be a computer application that can act as an intermediary between Originating Entity 208 and Centralized Processing Agent 201. An Originating Entity 208 can be an entity (such as a person or computer application) that first originates the message. Likewise, Terminating Application 207 can be a computer application that can act as an intermediary between Centralized Processing Agent 201 and Terminating Entity 209. Terminating Entity 209 can be an entity (such as a computer application or person) that is the final actual or intended destination for the message. In some embodiments of the present invention, Centralized Processing Agent 201 can communicate directly with Originating Entity 208 and/or Terminating Entity 209, without communicating with an Originating Application 206 and/or Terminating Application 207, respectively.

Centralized Processing Agent 201 or Service Control Point 203 can formulate a query for Identity Database 204 based upon message data pertaining to a message received in this embodiment of the present invention at the Centralized Processing Agent 201. Identity Database 204 can be accessed using SS7, XML or any other suitable protocol. Message data can include all or part of the received message and/or information about the message, such as the source address of the message, the originating telephone number, the originating e-mail address, the originating IP address, a device identifier of the originating device, and/or any other information suitable for use as a basis for looking up information regarding a property (such as the identity) of the Originating Entity 208 or some other intermediary entity between the Originating Entity 208 and the Terminating Entity 209. Identity Database 204 stores information about senders, such as a photograph, graphic, video clip and/or audio clip associated with a sender. The sender information can be correlated with message data. In this way, Identity Database 204 can correlate certain data that can be part of the message with other identity information that may not be part of the message as it was sent. Based upon the results of the query, Centralized Processing Agent 201 or Service Control Point 203 can cause sender information to be associated with the message. The sender information that can be associated with the message can be delivered, processed and/or used as discussed in greater detail below.

Figure 3:
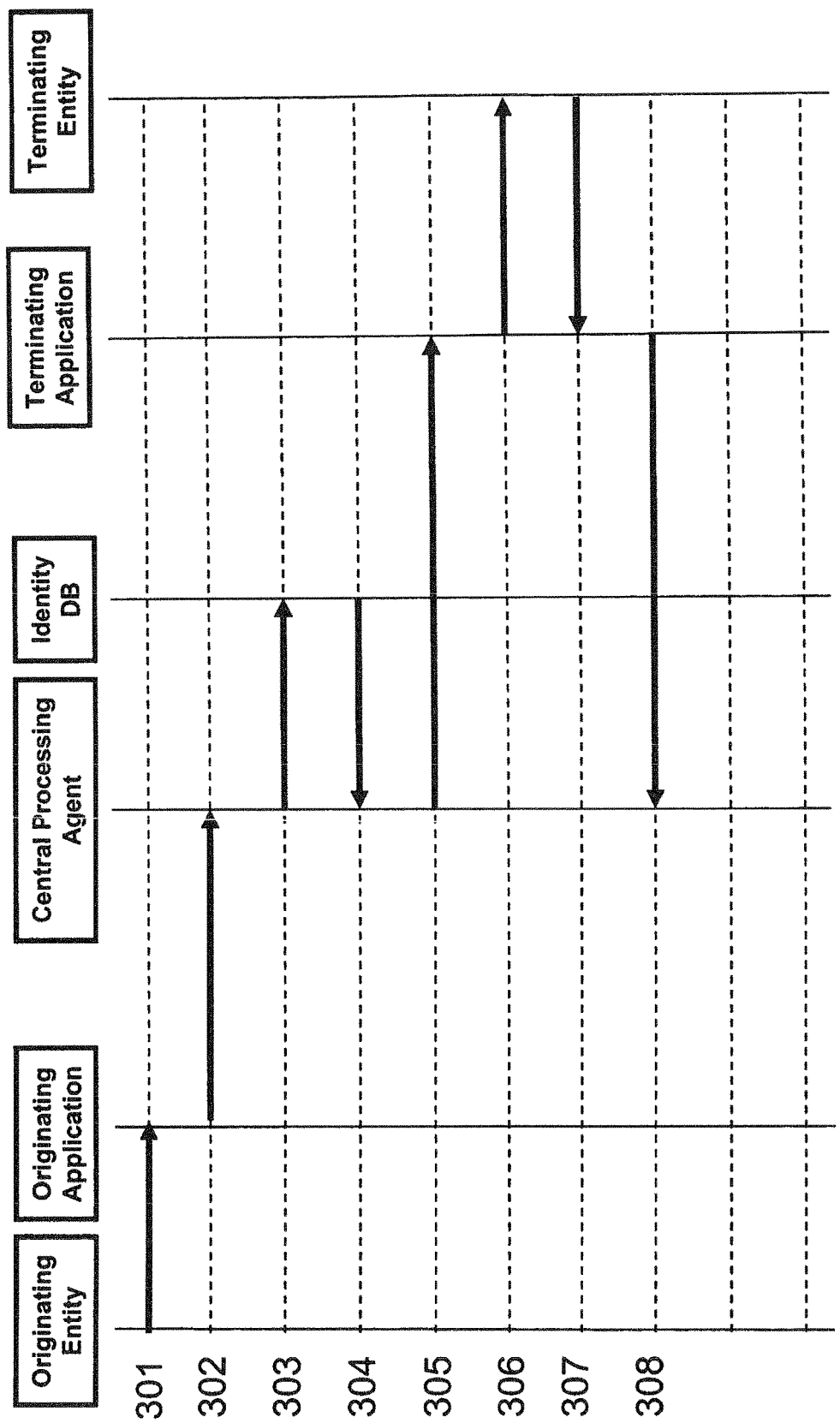
FIG. 3 shows a flow diagram where identity information can be associated with a message by a Centralized Processing Agent in accordance with an embodiment of the present invention.

A flow diagram in accordance with an embodiment of the present invention is shown in FIG. 3. Originating Entity 208 (such as a person) sends a message 301 to Originating Application 206 which can process the message and/or send it 302 to Centralized Processing Agent 201. Alternatively, Originating Application 206 can automatically send the message 302 to Centralized processing Agent 201. For example, Terminating Entity 209 can subscribe to receive multimedia weather alerts from a weather web site, which can function as Originating Application 206. In one embodiment, Centralized Processing Agent 201 can determine if the message is to be associated with sender information. This can be done by comparing the destination address (e.g., destination wireless telephone number, e-mail address, etc.) of the message to a list of such destination addresses that require associated sender information. Such a list can be stored in a database (not shown) coupled to Centralized Processing Agent 201. Alternatively, Centralized Processing Agent 201 can cause all incoming messages to be associated with sender information.

For a message that requires associated sender information, Centralized Processing Agent 201 (or Service Control Point 203) formulates and sends to Identity Database 204 a query 303 based on message data. Based upon the response 304 from Identity Database 204, Centralized Processing Agent 201 can cause sender identification information to be associated with the message. The message data can include an originating cellular telephone number, source e-mail address, source IP address, business identifier, geo-location data or other information that is in or can be derived from the message and that pertains to the sender. The response from Identity Database 204 can be a photograph, a graphic, text, audio, video and/or animation information associated with the sender. The message and associated sender information 305 can be sent from Centralized Processing Agent 201 to Terminating Application 207. For example, the sender information can be sent as an envelope or header along with the body of the message to Terminating Application 207.

Terminating Application 207 can send the message and sender identification information 306 to Terminating Entity 209. For example, Identity Database 204 can store records that correlate a photograph of the sender with the message. Terminating Application 207 can cause the photograph to be displayed to the user (e.g., on a cell phone display) and provide the Terminating Entity 209 with the option of having the message rendered (e.g., displayed, played, etc.) based upon the photograph. If Terminating Entity does not want to view, listen to or accept the message, Terminating Entity 209 can send a signal 307 to Terminating Application 207, e.g., by pressing a button on a cell phone key pad. In that case, the message can be deleted. A signal 308 can also be sent from Terminating Application 207 to Centralized Processing Agent 201 (and ultimately to the Originating Application 206 and/or Originating Entity 208) indicating if the message was accepted, rejected, rendered, etc. It should be noted that a message can be sent directly from an Originating Entity 208 to Centralized Processing Agent 201 or through an Originating Application 206 in accordance with the present invention. Likewise, a message can be sent directly from Centralized Processing Agent 201 to a Terminating Entity 209, or through a Terminating Application 207.

In another embodiment, the sender information associated with the message can be evaluated at Terminating Application 207 to determine if the message is spam, i.e., an unsolicited message that the recipient does not wish to see. Terminating Application 207 can perform this function using any suitable anti-spam method as is known in the art. In that case, Terminating Application 207 can block messages determined to be spam from being sent to Terminating Entity 209. Such a spam determination can be made by any entity that handles the message and to which associated sender information is available in various embodiments of the present invention, such as Originating Application 206, Centralized processing Agent 201, Terminating Application 207, etc.

Figure 4:
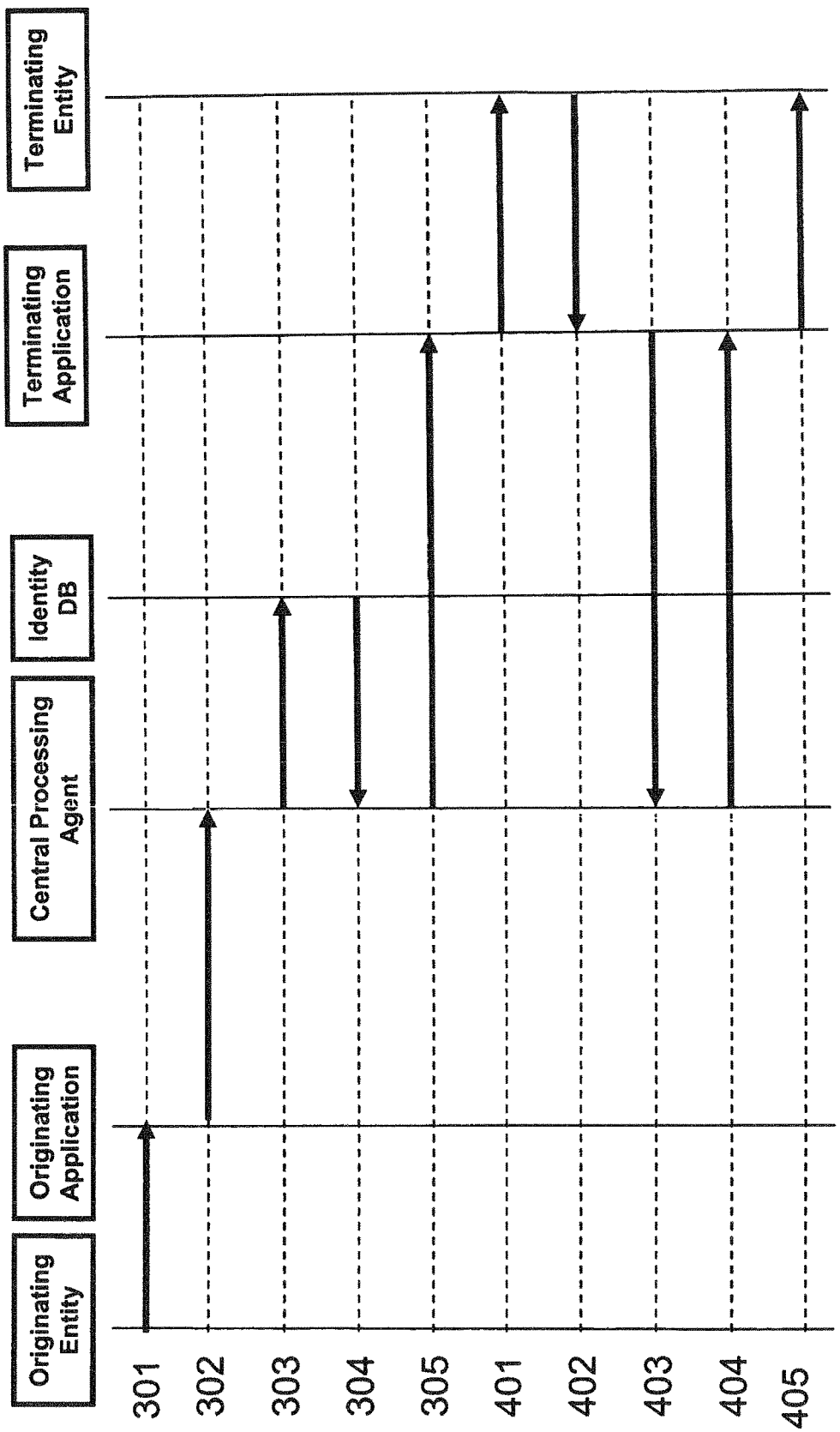
FIG. 4 shows a flow diagram where identity information can be associated with a message by a Centralized Processing Agent in accordance with another embodiment of the present invention.

FIG. 4 shows a flow diagram in accordance with another embodiment of the present invention. In this embodiment, identity information 401 can be sent without the associated message from Centralized Processing Agent 201 to Terminating Application 207, while the message itself is stored at, for example, Message and Content Storage Database 205. The identification information is presented to Terminating Entity 209. Based upon the identification information, Terminating Entity 209 sends an accept or reject signal 402 to Terminating Application 207. Based upon this accept or reject signal, Terminating Application 207 can send a message 403 to Centralized Processing Agent 201 requesting that the associated message be sent or not sent, respectively, to Terminating Application 207. If the message 404 is sent, then Terminating Application 207 can forward it 405 to Terminating Entity 209.

Figure 5:
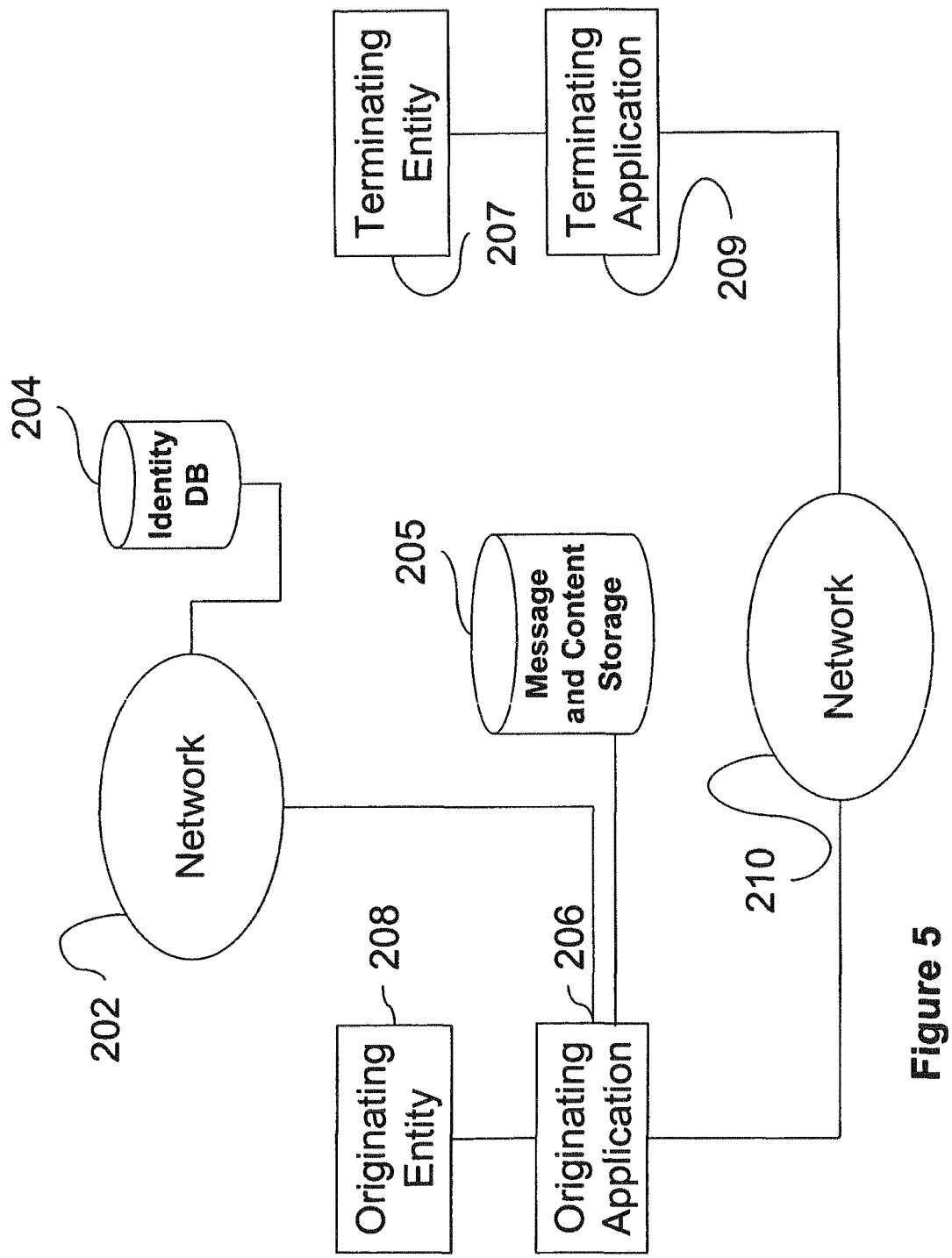
FIG. 5 shows a messaging system where an identity database can be accessed by an Originating Application in accordance with an embodiment of the present invention.

FIG. 5 shows a system in accordance with another embodiment of the present invention. Here, Originating Application 208 can query identity database 204 through network 202 based upon information pertaining to a message, such as data that is part of the message. Such message information can include all or part of the message itself and/or information about the message. Originating Application 206 can cause the response to the query (e.g., sender identification information) to be associated with the message. It can then send the message and associated sender information through a network 210 (such as the Internet) to a Terminating Application 207 or a Terminating Entity 209. Originating Application 206 can also be coupled to Message and Content Storage Database 205, which can store message and/or sender information data.

Figure 6:
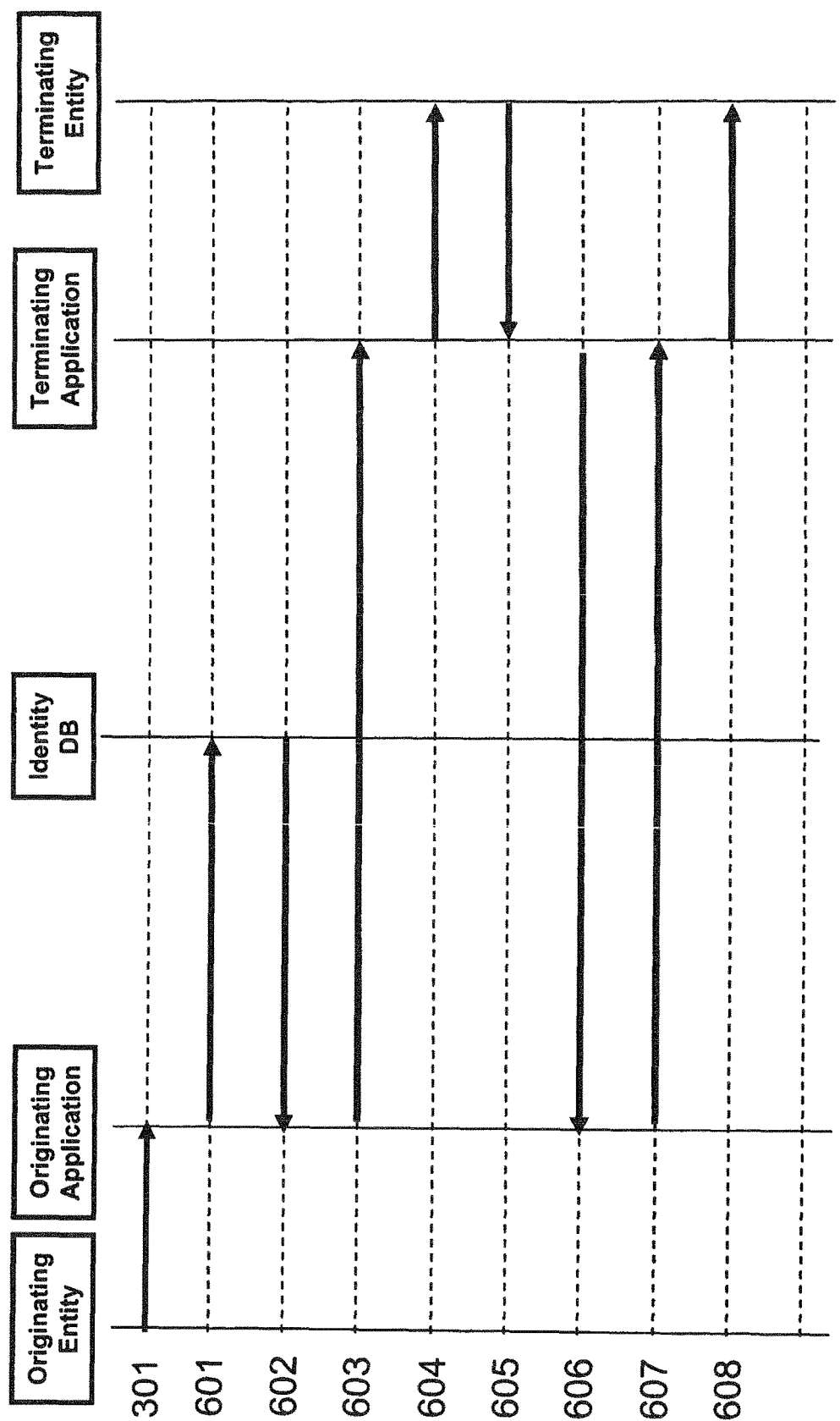
FIG. 6 shows a flow diagram where identity information can be associated with a message by an Originating Application in accordance with an embodiment of the present invention.

FIG. 6 shows a message flow in accordance with an embodiment of the present invention in which an originating application can associate sender information with a message. Originating Entity 208 can send a message 301 to Originating Application 206, which can query 601 Identity Database 204 based upon message information, such as data that is part of the message. It can use the response 602 to associate with the message identity information that may not be part of the message as it was sent. Originating Application 206 can cause the message and associated sender information 603 to be sent to Terminating Application 207, which can solicit 604 an accept or reject signal 605 from Terminating Entity 209. Based upon this signal 605, Terminating Application 207 can send a request 606 to Originating Application 206 to send the message, which Terminating Application 207 can receive 607 and then send 608 to Terminating Entity 209.

Figure 7:
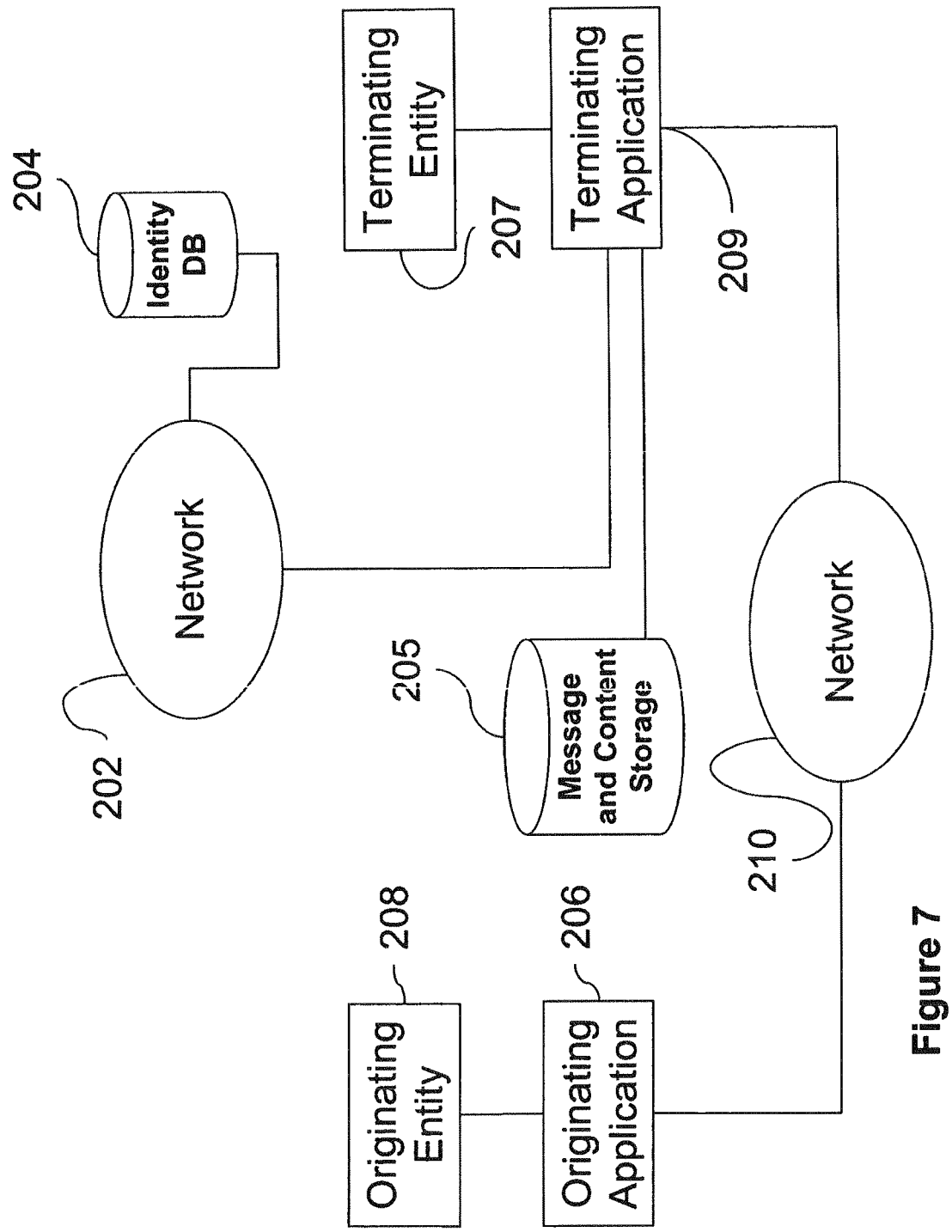
FIG. 7 shows messaging system where an identity database can be accessed by a Terminating Application in accordance with an embodiment of the present invention.

FIG. 7 shows a system in accordance with another embodiment of the present invention in which a terminating application can associate sender information with a message. Originating Application 206 can send a message through a network such as the Internet 210 to Terminating Application 207. Terminating Application 207 can be coupled to Identity Database 204, e.g., through signaling network 202 and to a Message and Control Storage Database 205. Terminating Application 207 can formulate a query based upon message information to Identity Database 204 and, based upon the response, cause sender information to be associated with the message. The sender information can be sent along with the message to a Terminating Entity (not shown), which can accept or delete the message based upon the sender information. Likewise, the sender information can be sent without the message to the Terminating Entity. In this case, the message can be stored in Message and Content Storage Database 205. The Terminating Entity can send and accept or reject signal to Terminating Application 207, which can then forward the message or not forward it, respectively, based upon the content of the signal from the Terminating Entity.

Figure 8:
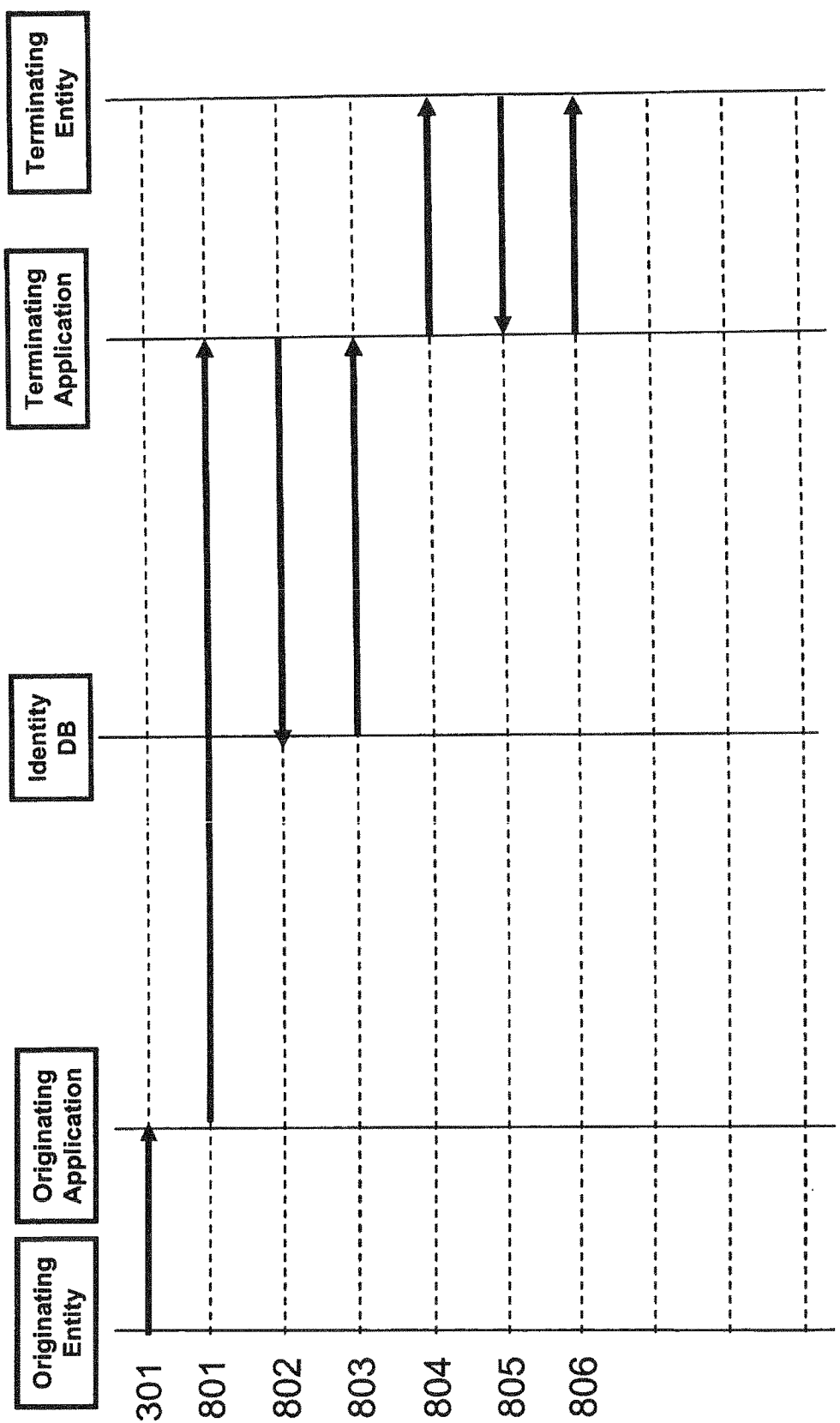
FIG. 8 shows a flow diagram where the identity information can be associated with a message by a Terminating Application in accordance with an embodiment of the present invention.

FIG. 8 shows a flow diagram in accordance with an embodiment of the present invention as described in connection with FIG. 7. An Originating Entity 208 can send a message 301 to an Originating Application 206, which can send it along 801 to Terminating Application 209. Terminating Application 209 can query 802 Identity Database 204 for sender information 803. Terminating Application 209 can send the sender information 804 to the Terminating Entity 207 and receive an accept or reject signal 805 in return. If content of the accept or reject message 805 is to accept the message associated with the sender information, the Terminating Application 209 can send the message 806 to the Terminating Entity 207. Alternatively, Terminating Application 209 can send both the message and the associated sender information to Terminating Entity 207, which can locally decide whether to render the message or delete it based upon the sender information.

In yet other embodiments, Terminating Entity 209 can receive a message but not fully display it to the user. Terminating Entity 209 can cause identity information to be associated with the received message by formulating a query based upon message information (such as message data) and sending it to Identity Database 204. Identity Database can return identity information associated with the sender of the message. This identity information can be displayed to the user that can be utilized by the user as the basis for entering an accept or reject signal at Terminating Entity 209. If an accept indication is detected at Terminating Entity 209, then the message itself is rendered to the user. If a reject indication is detected at Terminating Entity 209, then the message can be deleted. An indication as to whether the message was accepted and/or deleted can be sent back to the originator.

In one embodiment, Terminating Entity 209 can be caused to obtain associated identity information with a message by running or interpreting an executable or interpretable program sent as part of the received message or as an attachment to the received message. The executable or interpretable program can contain instructions adapted to be executed by a processor at Terminating Entity 209 to formulate a query based upon the received message (e.g., the source telephone number, the source IP address, content in the body of the message, etc.) and send it to Identity Database 204. The instructions can be executed by the processor to receive the response from Identity Database 204, cause it to be displayed in some form to the user, and detect an accept or reject indication from the user. Based on the detected indication, the instructions can be executed by the processor to either render the message to the user or not.

Identity information can also be associated with a message at the outset by Originating Entity 208 which can formulate a query and send it to Identity Database 204 to obtain identity information that can be associated with the message. The message and associated identity information can be sent to a recipient that can evaluate the identity information as a basis for accepting and/or passing on the message itself.

In accordance with an embodiment of the present invention, Originating Entity 208 can be a cell phone, a software application (e.g., at a web site), etc. For example, Originating Entity 208 can be a cell phone utilized by a user to send a text, audio, video or other kind of message to another user at a different cell phone, e.g., Terminating Entity 209. Originating Entity 208 can be a software program running at a weather web site that automatically sends a message in any suitable media, such as a short animated graphic showing weather patterns move across a geographic area, every day at the same time to a subscriber with a computer or cell phone (Terminating Entity 209.)

Originating Application 206 and Terminating Application 207 can be local messaging centers responsible for storing and forwarding messages to and from their respective sets of originating and terminating entities, e.g., sets of cell phone customers. For example, Originating Application 206 can be a local messaging center operated by Sprint for Sprint messaging customers, and Terminating Application 207 can be operated by MCI for messaging MCI customers. Alternatively, they can be operated by the same carrier for subscribers in different geographic locations, e.g., Originating Application 206 can be in Chicago and Terminating Application 207 can be in Cleveland.

Centralized processing Agent 201 can be an inter-carrier message center responsible for routing and/or storing and forwarding messages between messaging centers, and/or associating identity information with a message. Central Processing Agent 201 can be operated by a carrier, by a third party service provider, or by any suitable party.

Anti-spam features can be implemented in embodiments of the present invention utilizing the identity information associated with a message. For example, at any point along the path taken by the message and/or identity information (e.g., any entity from and including Originating Entity 208 to and including Terminating Entity 209, including Originating Application 206, Centralized Processing Agent 201, Terminating Application 207, etc.) a filter can be applied that can block or pass on the message and/or identity information based upon, for example a blacklist. In this embodiment, a set of identity information items (e.g., photographs, textual representations of users names, vide clips, audio clips, etc.) can be maintained on a blacklist. An entity along the transmission path can compare identity information associated with a message to the blacklist. If the identity information is on the blacklist, then the message and/or identity information can not be forwarded to the next entity in the transmission path, can be deleted, can be specially labeled as a result of being associated with a blacklist, etc. Similarly, a whitelist can be maintained where the message and/or identity information is only forwarded if the identity information associated with the message is also on a whitelist, can be specially labeled as a result of being associated with a whitelist, etc. This can be done for identity information such as audio clips, video clips and photographs by comparing a hash, Message Authentication Code ("MAC"), digital signature, etc., of the identity information with a list of hashes, MACs, digital signatures, etc. on the blacklist or whitelist. Special labels can include setting a flag or associating some other kind of label with the message and/or identity information, such as "warning," "pornographic," "whitelist-approved," etc.

Likewise, more complex filtering techniques can be used in accordance with embodiments of the present invention. For example, a profile can be stored that is associated with any entity in the message path, where the profile includes a policy for handling a message based upon its associated identity information. For example, a profile for John Smith can include policy rules such as, "If identity information indicates message is from Paul Johnson, then forward message only during regular business hours"; "If identity information indicates message is from Acme Corporation, mark message URGENT and forward immediately"; "If message is not from Beta Corporation, then authenticate sender before forwarding"; "Delete any message that is associated with authenticated sender identity information"; etc. Any suitable rule can be implemented in the profile and enforced. In particular, the profile can store policy rules correlated with the appropriate identity information. An entity in the transmission path can consult the database storing the identity and rule information, find the rule, if any, associated with the identity information that is associated with the message, and then perform the action or actions prescribed by the rule.

In an embodiment of the present invention, an entity in the transmission path can receive a message and first determine if sender identity information should be caused to be associated with the message based upon address data in the message for the intended recipient. For example, the intended recipient can be required to subscribe to a service that associates sender identity information with a message to the recipient, and permits the recipient or another entity in the transmission path to take some action with respect to the message. Identity information can be stored in Identity Database 204, which can associate certain data that can be contained in the message, such as a source IP address, a sender telephone number, business identifier, geo-location data, all or part of a domain name, header information, etc. with sender identity information that may not be contained in the message, such as a photograph of the sender, a video clip, an audio clip, animation, text (e.g., the sender's name and/or location, etc.) A query that includes data that can be contained in the message is formulated and sent to Identity Database 204, which sends a response containing the associated sender information that may not be in the message, e.g., a photograph, video clip, text, etc.

Figure 9:
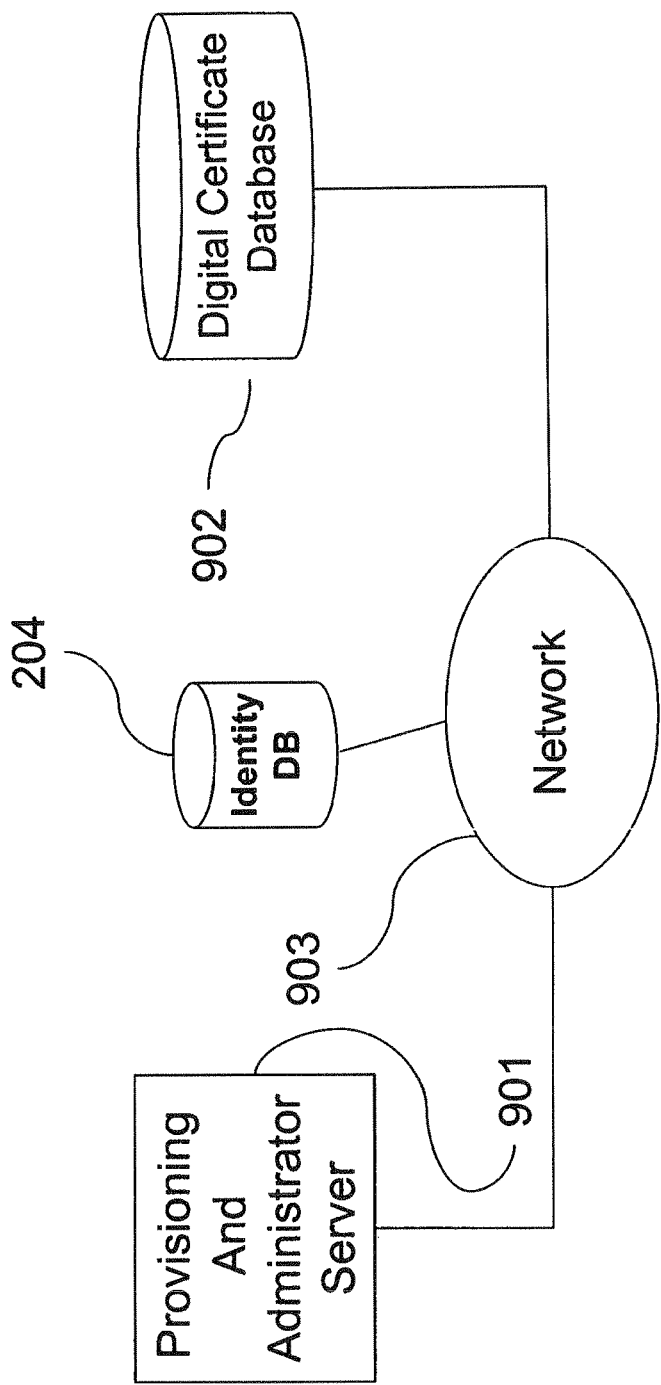
FIG. 9 shows a network topology for provisioning and administering identity information in accordance with an embodiment of the present invention.

FIG. 9 shows a system for provisioning and administering identity information in accordance with an embodiment of the present invention. A Provisioning and Administrator Server 901 is coupled to Identity Database 204 and Digital Certificate database 902 through a network 903 such as the Internet. Identity Database 204 can include identity information of various forms including, but not limited to, text, numeric text, alpha-numeric text, photographs, graphics, animation, video content, audio content, executable code, etc. The system can permit a database administrators to associate identity information with data such as Mobile Identification Numbers, Electronic Serial Numbers, Automatic Number Identification, Geo-location data, e-mail addresses, Instant Messaging pseudonyms and other aliases, etc., that can be obtained during the operation of data messaging and/or content services. The identity information with which this data can be associated can include a text version of a sender's name, a photograph or graphic of the sender or sender's organization, a video clip representative of the sender, an audio clip such as an audio greeting from the sender, etc. Security can be maintained using digital certificates. For example, the integrity of digitally signed identity information can be verified by the Provisioning and Administrator Server 801 by consulting the Digital Certificate Database 902.

Authentication can be implemented in accordance with embodiments of the present invention. For example, a subscriber profile can specify that a successful challenge/response must be exchanged with Originating Entity 208 and/or Originating Application 206 before a message is to be forwarded to Terminating Entity 209. For example, an entity in the transmission path can send a query to an Originating Entity 208 asking Originating Entity 208 to enter his mother's maiden name. The entry is compared to a stored version of the correct answer, and the message can be forwarded only if there is a correct match. Otherwise, the message can be deleted. Likewise, sender information can be digitally signed by the sender and/or by a Certification Authority. The signature can be checked by an entity in the transmission path. If the signature cannot be successfully verified, then the message can be deleted. Otherwise, the message can be forwarded and/or read. Also, multi-factor authentication schemes can be implemented, for example, at Originating Entity 208 (e.g., a first cell phone) and Terminating Entity 209 (e.g., a second cell phone.) A one time password can be generated using a first secret stored at Originating Entity 208 along with, for example, a Personal Identification Number (PIN) known only to a user of the first cell phone. Terminating Entity 209 can require that the one time password be verified by any entity in the transmission path. If the one time password is not successfully verified, then the message can be deleted. Otherwise, the message can be forwarded and/or read.

An embodiment of the present invention can be implemented by instructions stored on a medium or transmitted over a network, where the instructions are adapted to be executed by a processor to perform all or part of the method in accordance with the present invention. An apparatus that implements an embodiment of the present invention can include such instructions stored in a memory coupled to a processor adapted to execute the instructions. Examples of memory include Random Access Memory, flash memory, Read Only Memory, a hard disk, a Compact Disc, and any other medium adapted to store digital information. Examples of a processor include the Pentium IV processor manufactured by the Intel Corporation of Santa Clara, Calif. A processor can also be an Application Specific Integrated Circuit (ASIC) that embodies at least part of the method in accordance the present invention in hardware and firmware. The processor can also be coupled to a display, where a display is any device suitable for rendering digital information in a perceptible manner. Examples of a display include a LCD screen, a CRT screen, a speaker, etc. The processor can also be coupled to an input device, such as a touch screen, keypad, microphone, etc.

The foregoing examples are meant to illustrate the present invention. One of ordinary skill in the art will appreciate that the full scope of the invention extends beyond the examples discussed above. For example, while the examples describe the present invention with respect to a MMS messaging protocol, the present invention also encompasses embodiments in accordance with other protocols, such as SMS, EMS and WAP. For example, sender identification information can be associated and used with a SMS or WAP message in much the same way as it is associated with a MMS message. These and other embodiments are within the scope of the present invention.

What is claimed is:

1. A method for messaging, including:
   sending to an identity database a query based upon data included in a received message, the received message originating from a sender at a first device in a first protocol and directed to a recipient at a second device;
   receiving from the identity database information pertaining to the identity of the sender of the message, including identity information that is not a part of the message;
   locating a rule set by the recipient of the message, the rule being associated with the identity of the sender of the message;
   handling the message according to the rule; and
   wherein the handling is performed without receiving additional input from the recipient and includes at least one of providing the message to the recipient in a second protocol and not providing the message to the recipient,
   wherein the second protocol is different than the first protocol and comprises at least one of a Short Message Service ("SMS") or Multimedia Messaging Service ("MMS");
   when the message is provided to the second device according to the rule, rendering the message to the recipient and providing an indication to the sender that the message was provided to the recipient, and
   when the message is not provided to the second device according to the rule, identifying that the message is subject to deletion and providing an indication to the sender that the message was not provided to the recipient.

2. The method of claim 1, wherein the information about the sender comprises an address of the sender.

3. The method of claim 1, wherein the sender of the message is a person or a computer application program.

4. The method of claim 3, wherein if the sender is a person, the information about the sender comprises a photograph of the person.

5. The method of claim 1, wherein the recipient of the message is a person or a computer application program.

6. A non-transitory medium storing instructions adapted to be executed by a processor to perform steps including:
   sending to an identity database a query based upon data included in a received message, the received message originating from a sender at a first device in a first protocol and directed to a recipient at a second device;
   receiving from the identity database information pertaining to the identity of the sender of the message, including identity information that is not a part of the message;
   locating a rule set by the recipient of the message, the rule being associated with the identity of the sender of the message;
   handling the message according to the rule; and
   wherein the handling is performed without receiving additional input from the recipient and includes at least one of providing the message to the recipient in a second protocol and not providing the message to the recipient,
   wherein the second protocol is different than the first protocol and comprises at least one of a Short Message Service ("SMS") or Multimedia Messaging Service ("MMS");
   when the message is provided to the second device according to the rule, rendering the message to the recipient and providing an indication to the sender that the message was provided to the recipient, and
   when the message is not provided to the second device according to the rule, identifying that the message is subject to deletion and providing an indication to the sender that the message was not provided to the recipient.

7. The medium of claim 6, wherein the information about the sender comprises an address of the sender.

8. The medium of claim 6, wherein the sender of the message is a person or a computer application program.

9. The medium of claim 6, wherein the recipient of the message is a person or a computer application program.

10. An apparatus for messaging, including:
    a processor;
    a display coupled to said processor;
    an input device coupled to said processor; and
    a memory coupled to said processor, said memory storing instructions adapted to be executed by said processor to:
    receive from an identity database information pertaining to the identity of a sender of a message, the message originating from the sender at a first device in a first protocol and being directed to the recipient at a second device, wherein the information includes identity information that is not a part of the message;
    locate a rule set by the recipient of the message, the rule being associated with the identity of the sender of the message;
    handle the message according to the rule; and
    wherein the handling is performed without receiving additional input from the recipient and includes at least one of providing the message to the recipient in a second protocol and not providing the message to the recipient,
    wherein the second protocol is different than the first protocol and comprises at least one of a Short Message Service ("SMS") or Multimedia Messaging Service ("MMS");

when the message is provided to the second device according to the rule, rendering the message to the recipient and providing an indication to the sender that the message was provided to the recipient, and when the message is not provided to the second device according to the rule, identifying that the message is subject to deletion and providing an indication to the sender that the message was not provided to the recipient.

11. The apparatus of claim 10, wherein the sender of the message is a person or a computer application program.

12. The apparatus of claim 11, wherein if the sender is a person, the information about the sender comprises a photograph of the person.

13. The apparatus of claim 10, wherein the recipient of the message is a person or a computer application program.

* * * * *